United States Patent
Fuji et al.

[11] Patent Number: 5,831,618
[45] Date of Patent: Nov. 3, 1998

[54] RECONFIGURABLE NETWORK MAP DISPLAY SYSTEM

[75] Inventors: Hiroko Fuji; Shoichiro Nakai, both of Tokyo, Japan

[73] Assignee: NEC Corporation, Tokyo, Japan

[21] Appl. No.: 808,165

[22] Filed: Feb. 28, 1997

[30] Foreign Application Priority Data

Feb. 29, 1996 [JP] Japan ................................. 8-069469

[51] Int. Cl.$^6$ ....................................................... G06F 3/14
[52] U.S. Cl. ........................... 345/356; 345/969; 345/357
[58] Field of Search .................... 345/356, 353, 345/357, 342, 352, 969, 333, 329, 335, 345, 346; 395/200.54, 200.53

[56] References Cited

U.S. PATENT DOCUMENTS

| | | | |
|---|---|---|---|
| 5,185,860 | 2/1993 | Wu | 395/200.54 |
| 5,276,789 | 1/1994 | Besaw et al. | 395/999 |
| 5,295,244 | 3/1994 | Dev et al. | 345/351 |
| 5,572,640 | 11/1996 | Schettler et al. | 395/200.56 |
| 5,689,645 | 11/1997 | Schettler et al. | 395/200.01 |

OTHER PUBLICATIONS

"HP Openview Windows User's Guide", Jun. 1992, pp. 3–6 3–9, Hewlett Packard, Manual No. J2316–90000.

MAPCon: An Expert System To Configure Communication Networks, H. Van Dyke Parunak, Industrial Technology Institute, IEEE, Aug. 1989.

Graphical Methods To Analyze Network Data, richard A. Becker, AT&T Bell Laboratories, Naperville, Illinois, USA, Feb. 1993.

*Primary Examiner*—Raymond J. Bayerl
*Assistant Examiner*—Thomas Nguyen
*Attorney, Agent, or Firm*—Young & Thompson

[57] ABSTRACT

Hierarchically layered tables are stored in a mass memory. Each table has entries containing a symbol of a telecommunication network item, location data of the symbol to be displayed in a display unit, and an identifier specifying a lower-layer table. A pointing device is used for selecting an symbol being displayed corresponding to a symbol of an upper layer table. A relocation processor is responsive to a keyboard command for detecting a given entry of the upper layer table that contains the selected symbol, reading information from all entries of a lower layer table specified by the given entry of the upper-layer table, securing a space around the selected symbol using the location data of the read information, and storing it into that entry of the upper layer table. A display processor displays, in the second space, multiple symbols stored in the given entry of the upper layer table.

5 Claims, 6 Drawing Sheets

Map ID = M0

| Symbol Name | Symbol ID | Submap ID | Location |
|---|---|---|---|
| Head Office | S1 | M1 | x1, y1 |
| Branch Office "A" | S2 | M2 | x2, y2 |
| Branch Office "B" | S3 | M3 | x3, y3 |

Map ID = M2

| Symbol Name | Symbol ID | Submap ID | Location |
|---|---|---|---|
| Computer Room | S4 | M4 | x4, y4 |
| PC1 | S5 | — | x5, y5 |
| PC2 | S6 | — | x6, y6 |
| PC3 | S7 | — | x7, y7 |

Map ID = M4

| Symbol Name | Symbol ID | Submap ID | Location |
|---|---|---|---|
| Host 1 | S8 | — | x4, y8 |
| PC11 | S9 | — | x9, y9 |
| PC12 | S10 | — | x10, y10 |
| PC13 | S11 | — | x11, y11 |

RECONFIGURABLE NETWORK MAP DISPLAY SYSTEM

BACKGROUND OF THE INVENTION

1. Field of the Invention

The present invention relates to a network map display system for graphically displaying interconnected symbols of telecommunications networks in separate windows.

2. Description of the Related Art

Network map display systems are used to provide a display of graphic symbols of telecommunications network items. If the scale of a telecommunications network is too large or too complex to display all network items in a single window, the network is divided into hierarchical layers which are displayed in separate windows, ranging from upper layer maps of backbone network structure to lower layer maps of network terminals, as described in "HP Open View Windows User's Guide", Hewlett Packard, 1992. However, if the number of network layers increases, it is a time consuming job for the user to search through many windows as it involves clicking symbols in a window to open their sub-layer maps and then clicking submap symbols. Although an attempt to drastically reduce the number of hierarchical layers is impractical because it necessitates overall reconfiguration of the network maps, it is the usual practice to merge two or more windows by transferring symbols from a lower layer to an upper layer. However, deletion and re-registration of the transferred symbols are necessary. In addition, current network display systems do not allow lower layer maps to be displayed within an upper layer window.

SUMMARY OF THE INVENTION

It is therefore an object of the present invention to provide a network map display system that reduces the burden of users for making a search through hierarchically layered windows and for making alterations in the network maps.

According to one aspect of the present invention, there is provided a network map display system comprising a display unit, storage means for storing a plurality of hierarchically layered tables, each table including a plurality of entries and each entry containing a symbol of a telecommunications network item, location data of the symbol to be displayed in the display unit, and an identifier specifying a lower layer table, a pointing device for selecting a symbol of a currently displayed upper layer table. A relocation processor is responsive to a command signal from a keyboard for detecting an entry of the upper layer table containing the selected symbol, reading information from all entries of a subordinate table specified by the entry of the upper layer table, securing a space in the display unit surrounding the selected symbol according to location data of the read information, and storing the read information into the entry of the upper layer table. A display processor is provided for displaying, in the secured space, a plurality of symbols stored in the entry of the upper layer table.

According to a further aspect, the present invention provides a network map display system comprising a display unit, storage means for storing a plurality of hierarchically layered tables in a upper layer-lower layer relationship, each table including a plurality of entries and each entry containing a symbol of a telecommunication item, location data of the symbol to be displayed in the display unit, and an identifier specifying a lower layer table. A pointing device selects multiple symbols of a upper layer table being displayed in the display unit. A relation processor is responsive to a command signal from a keyboard and selection of currently displayed multiple symbols by a pointing device for (a) detecting multiple entries of the upper layer table corresponding to the selected multiple symbols, (b) reading information from all entries of a plurality of lower layer tables specified by the multiple entries of the upper layer table, and reading information from the multiple entries of the upper layer table, and (c) storing the read information of the plurality of lower layer tables into an expansion memory and storing the read information of the upper layer table into a compression memory if location data of the upper layer table indicates that there is no sufficient space to display all symbols of the plurality of lower layer tables. A display processor is responsive to an "enlarge" command from the keyboard and selection of at least one currently displayed symbol by the pointing device for displaying an object of at least one symbol stored in the expansion memory in an enlarged window of the display unit, and further responsive to a "reduce" command from the keyboard and selection of one or more of the currently displayed symbols by the pointing device for displaying one or more symbols stored in the compression memory in reduced size within the enlarged window and merging all the displayed symbols.

BRIEF DESCRIPTION OF THE DRAWINGS

The present invention will be described in further detail with reference to the accompanying drawings, in which.

DETAILED DESCRIPTION

Figures 1, 2:
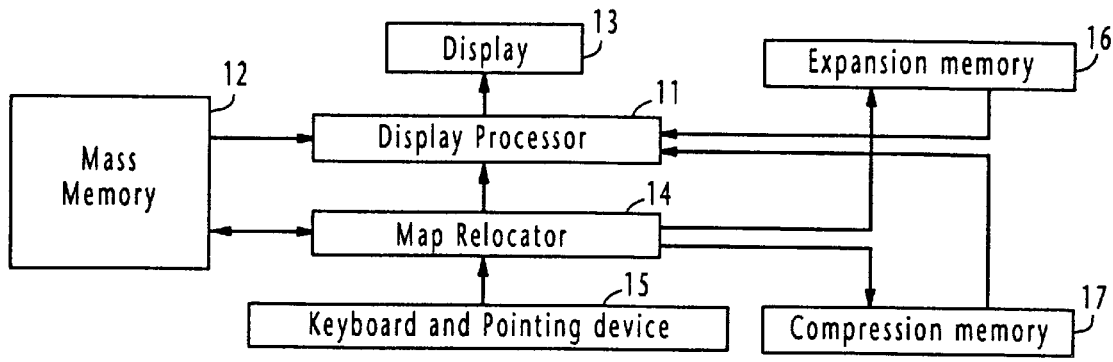
FIG. 1 is a schematic block diagram of a network map display system according to the present invention.
FIG. 2 are illustrations of exemplary hierarchical maps stored in a mass memory in the form of tables.

Referring now to FIG. 1, a network map display system of the present invention is illustrated as comprising a network map display processor 11, a mass memory 12 in which map data are stored, a CRT display unit 13, a map symbol relocator 14 for relocating symbols in a displayed map and reconstructing the map, and data input means 15 such as keyboard and pointing device. The network map processor 11 displays the output of the map symbol relocator 14 using the stored map symbols in a plurality of windows on the display unit 13. Further provided are an expansion memory 16 and a compression memory 17 both of which are connected to receive data from map relocator 14 and supply output data to display processor 11.

As shown in FIG. 2, the data stored in the memory 12 are organized into a plurality of management tables 20, 21 and 22 arranged in hierarchical order to be displayed as maps in separate windows. Each of these tables is divided into multiple rows (or entries) for network items and divided into multiple columns for different types of information, i.e., symbol names (i.e., network items), symbol identifiers, map identifiers for specifying lower layer maps (i.e., windows), x-y coordinate location data of the symbol to be displayed in the display unit 11. In the illustrated example, table 20 is identified as an upper layer map M0 and related to lower layer maps, or submaps M1, M2 and M3. Table 21 is identified as submap M2 and contains four entries one of which is related to table 22 that is identified as submap M4. Maps 20, 21 and 22 are displayed in respective windows.

One or more symbols which are currently displayed on the CRT display 13 are relocated from a lower layer window to an upper layer window. This relocation process starts with the selection of one or more symbols being currently displayed in the upper layer window by using the pointing device and keyboard input of a "relocate" command.

Figure 3A:
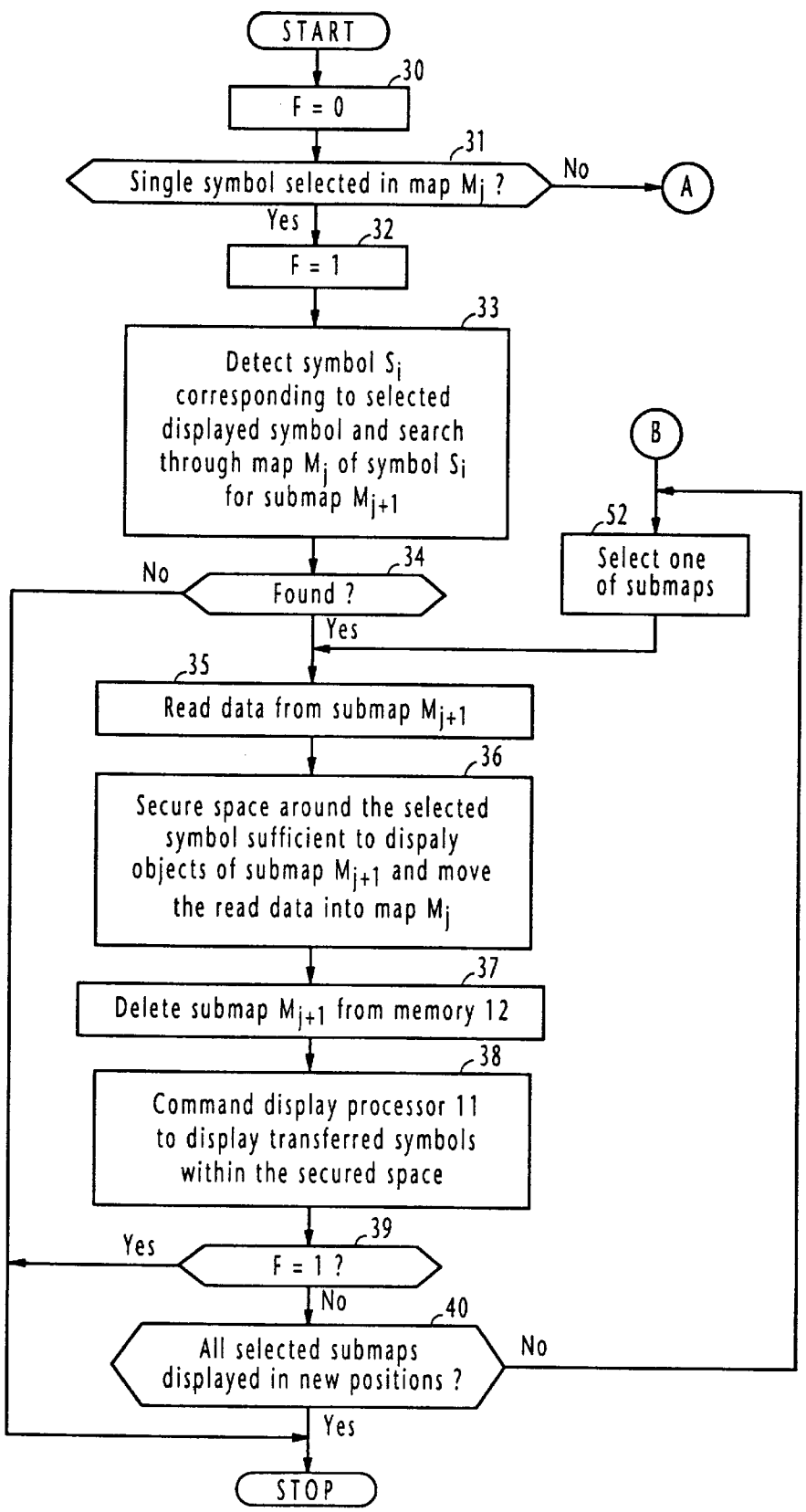
FIGS. 3A and 3B are flowcharts of the operation of a map relocator of this invention.

As illustrated in FIG. 3A, the operation of the map relocator 14 starts with step 30 in which flag F is set equal to 0 and flow proceeds to step 31 to check to see if there is only one symbol that is selected in a map (i.e., window) $M_j$. If this is the case, flow proceeds to step 32 to set flag F to 1 and proceeds to step 33 to detects a symbol $S_i$ corresponding to the selected symbol and search through the map $M_j$ for a submap $M_{j+1}$ corresponding to symbol $S_i$. If submap $M_{j+1}$ is found (step 34), flow proceeds to step 35 to read data from submap $M_{j+1}$ and secure a space around the selected symbol sufficient to display the symbols of submap $M_{j+1}$ using location data to submap $M_{j+1}$ and move the read data into map $M_j$ (step 36). If submap $M_{j+1}$ is not found, flow proceeds from step 34 to the end of the routine. Flow proceeds to step 37 to delete submap $M_{j+1}$ from mass memory 12. At step 38, map relocator 14 commands the display processor 11 to display the symbols of map $M_j$ transferred from submap $M_{j+1}$ within the secured space. At step 39, flag F is checked to see if it is 0 to 1. If F=1, flow proceeds to the end of the routine.

Figure 3B:
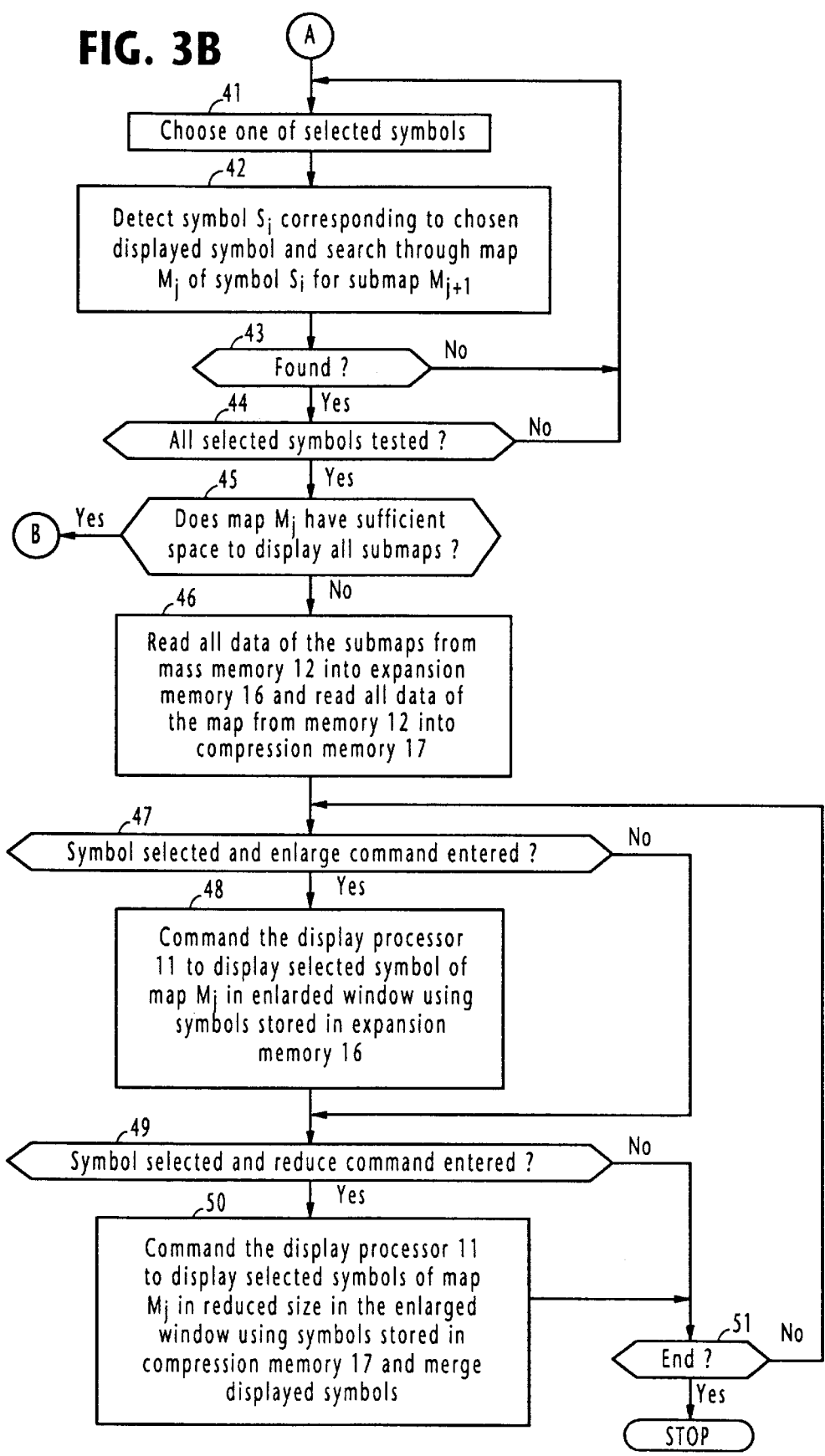

If there is more than one symbol selected in map $M_j$, the decision at step 31 is negative and flow proceeds to step 41 (FIG. 3B) to choose one of the selected symbols. At step 42, relocator 14 detects a symbol $S_i$ corresponding to the chosen symbol and search through the map $M_j$ for a submap $M_{j+1}$ corresponding to symbol $S_i$. If submap $M_{j+1}$ is found (step 43), flow proceeds to step 44 to determine whether all the selected symbols are tested. If not, flow returns to step 41, and if so, flow proceeds to step 45 to use all location data of map $M_j$ to determine whether the window of this map has a sufficient space to display all submaps. If the decision at step 45 is affirmative, flow proceeds to step 52 (FIG. 3A) to select one of the submaps and repeatedly execute steps 35 to 40 until all the selected submaps are displayed in new positions.

If map $M_j$ has not sufficient space to display all the submaps, the decision at step 45 is negative and flow proceeds to step 46 to read all information of the submaps from mass memory 12 into the expansion memory 16 and read all information of map $M_j$ from mass memory 12 into the compression memory 17.

At step 47, map relocator 14 waits for the entry of a select command from the pointing device when the user selects one or more symbols of map $M_j$ and an "enlarge" command from the keyboard. If an "enlarge" command is entered, flow proceeds from step 47 to step 48 to command the display processor 11 to display the selected symbols of map $M_j$ in an enlarged window using the symbols stored in the expansion memory 16, and flow proceeds to step 49. If no "enlarge" command is entered at step 47, flow also proceeds to step 49 to check to see if one or more symbols of map $M_j$ are selected in the display unit and a "reduce" command is entered. If so, flow proceeds to step 50 to command the display processor 11 to read the symbols stored in the compression memory 17 and display the selected symbols of map $M_j$ in reduced size within the enlarged window and merge all the displayed symbols. If no "reduce" command is entered at step 49, flow proceeds to step 51 to determine whether an "end" command is entered. If so, flow proceeds to the end of the routine, otherwise, it returns to step 47 to repeat the process.

The present invention will be fully understood by the following description with reference to FIGS. 4 to 7.

Figure 4:
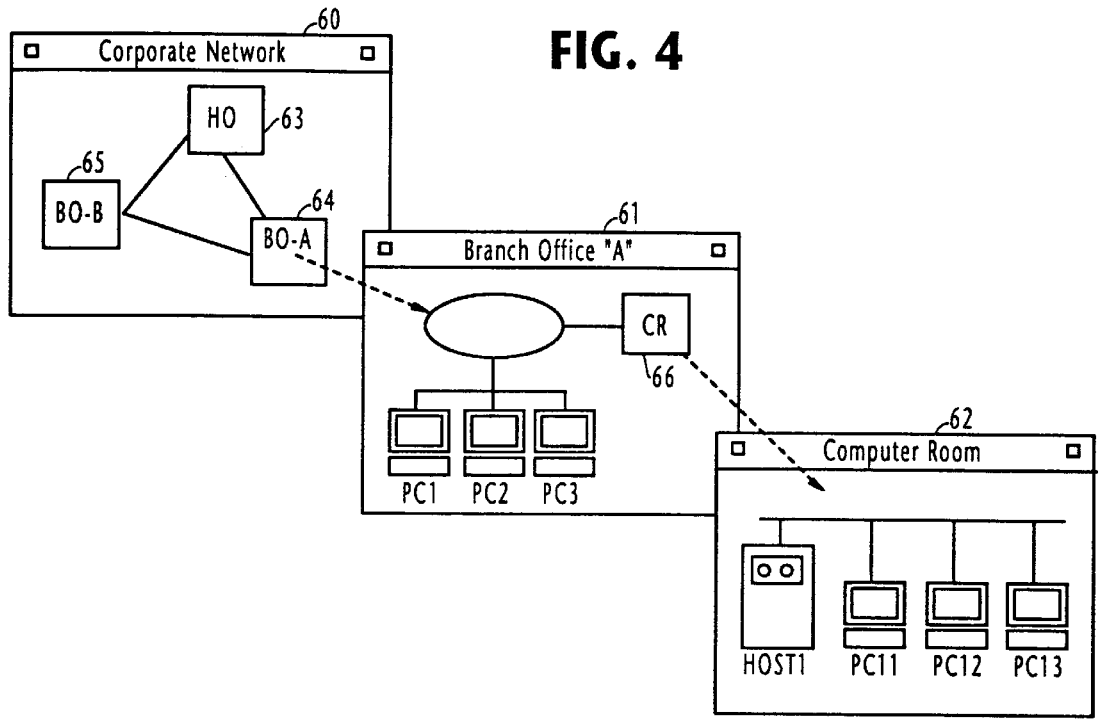
FIG. 4 is an illustration of exemplary windows corresponding to initial hierarchical maps.

FIG. 4 shows an exemplary case of three windows displayed in the CRT display 13. The window 60 displays symbols 63, 64, 65 corresponding respectively to symbols S1, S2 and S3 of the map M0 (i.e., table 20), showing interconnections between head office located at position (x1, y1) and branch offices "A" and "B" located respectively at positions (x2, y2), (x3, y3). The window 61 displays symbols S4 to S7 of the submap M2 (i.e., table 21) relating to symbol S2 (branch office "A"), and the window 62 displays symbols S8 to S11 of the submap M4 (i.e., table 21) relating to symbol S4 (the computer room of branch office "A").

In FIG. 4, if it is desired to relocate the window 62 into the computer room of window 61, the user selects the symbol 66 in window 61 by clicking it with the pointing device and enters a "display" command. Since the input data indicates that the command is of single-symbol case, the map relocator 14 recognizes that the selected symbol 66 corresponds to symbol S4 in map M2 and searches through map M2 for a submap (step 33). Since the submap is found to be M4, all data of submap M4 are reach out of this submap and a space is secured around the selected symbol 66 and the read data are moved into the computer room entry of map M2 (steps 34–36). Submap M4 is then deleted (step 37) and the transferred symbols of window 62 are displayed within the secured space of window 61 (step 38) as illustrated in FIG. 5.

Figure 5:
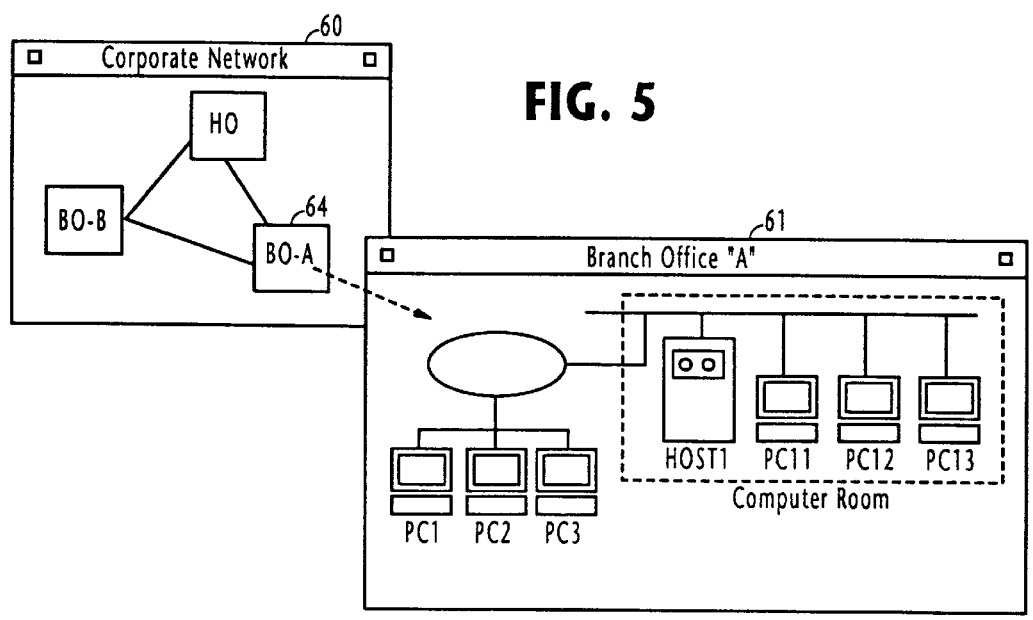
FIG. 5 is an illustration of modified windows of FIG. 4 according to a user's command when a single object is selected in a window.

Likewise, the submaps of symbols 63 and 65 of window 60 are displayed in the same manner as in FIG. 5.

If it is desired to display multiple symbols of map M0, the user may clicks symbols 63, 64, 65 displayed in window 60, FIG. 4, with the pointing device and enters a "relocate" command (step 31). Since multiple symbols are selected, the map relocator 14 proceeds to step 41 where one of the symbols 63, 64 and 65 is chosen and a corresponding symbol in map M0 is detected (step 42). This process is repeated until all symbols are determined corresponding to the selected multiple symbols (steps 41–44). If the window 60 has a sufficient space to display all the submaps of the selected symbols, the relocator proceeds to step 49 to display them by executing steps 35 to 40. Otherwise, the map relocator 14 executes steps 46 to read all symbols of the submaps M1, M2 and M3 from mass memory 12 into the expansion memory 16 and read all symbols of map M0 from memory 12 into the compression memory 17.

Figure 6:
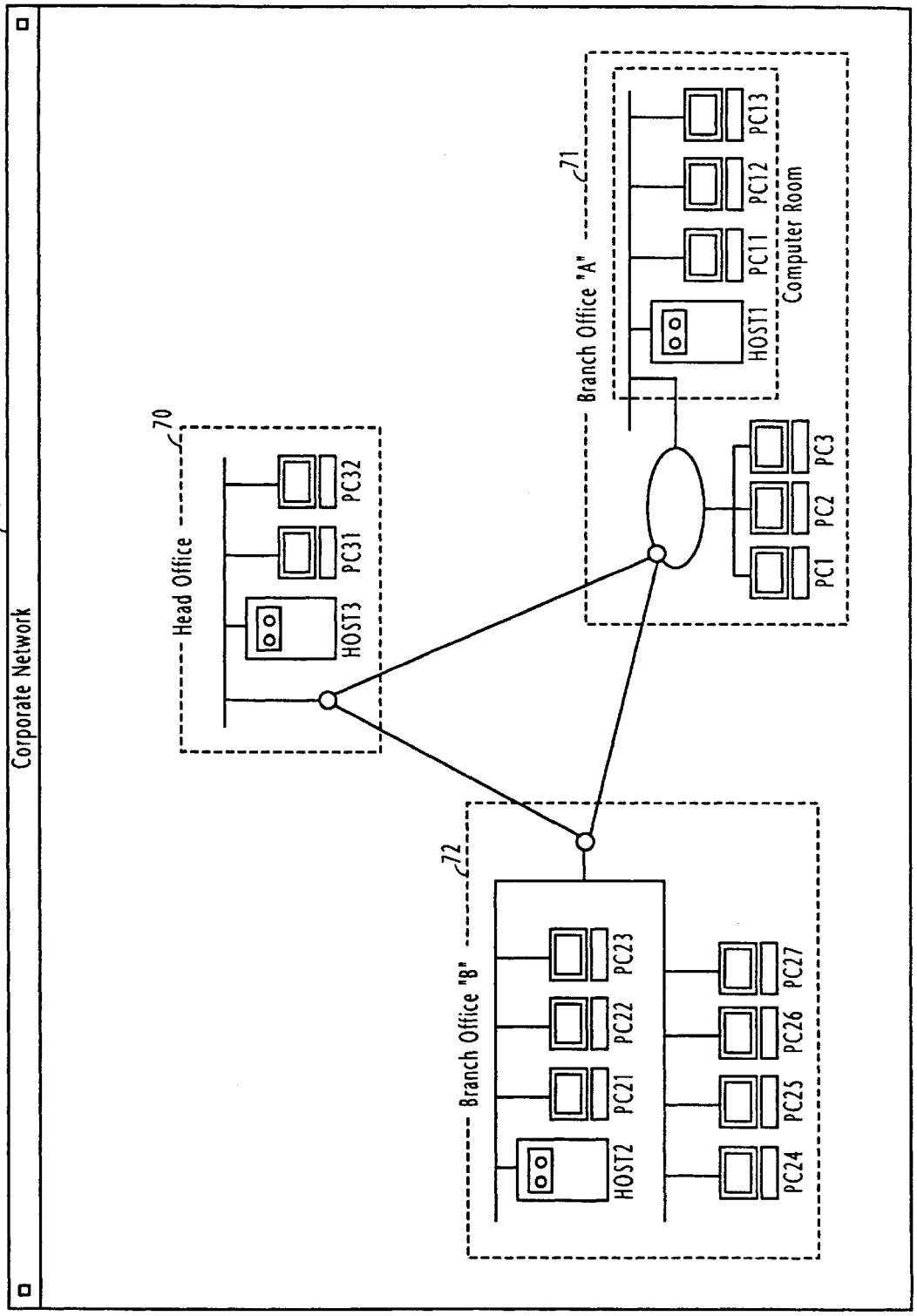
FIGS. 6 and 7 are illustrations of modified windows of FIG. 4 according to user's commands when one or more objects are displayed in windows of different sizes.

If the user clicks all symbols of map M0 in the window 60 (FIG. 4) and enters an "enlarge" command, flow proceeds from step 47 to step 48 and the contents of expansion memory 16 are used by the display processor 11 to display all the submaps M1, M2 and M3 of map M0 and their lower ranking submaps (only M4 is shown) are displayed in window 60 as indicated by numerals 70, 71 and 72 in FIG. 6. If the user desires no further symbols to be displayed, the entry of an "end" command is detected at step 51.

Figure 7:
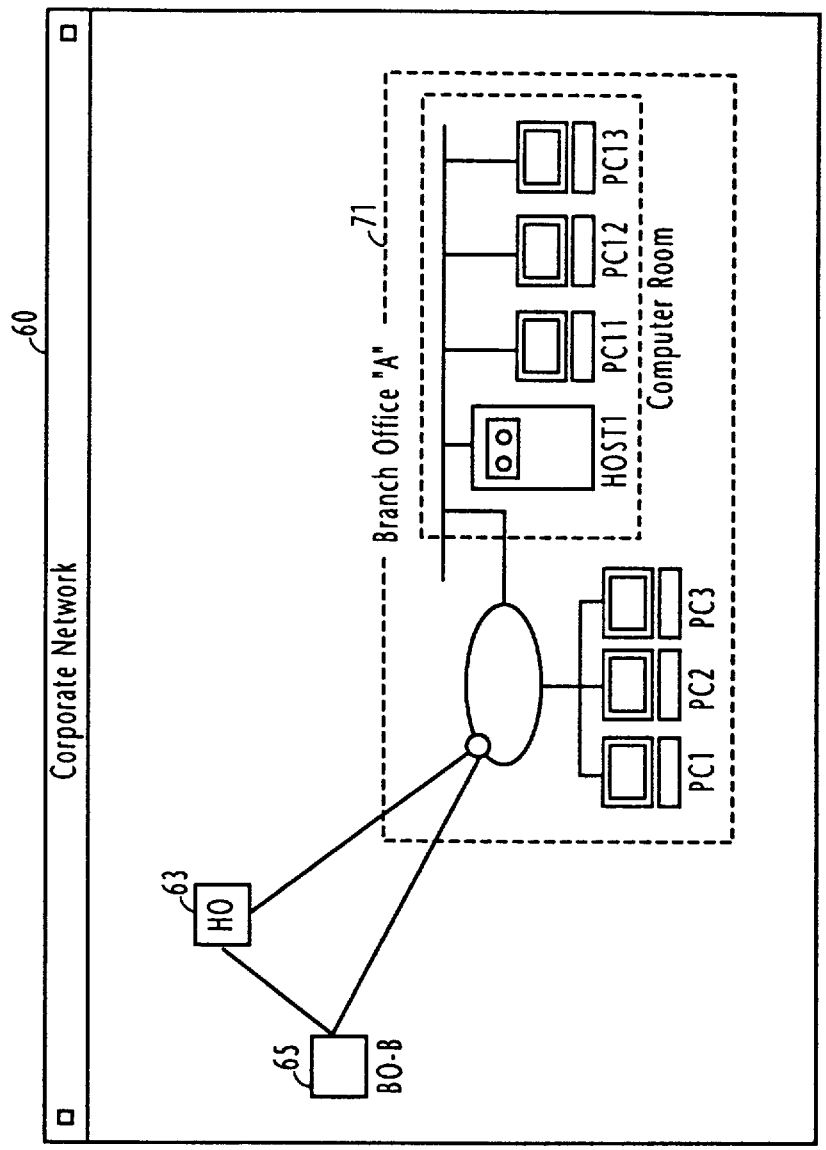

If the user clicks symbol 64 in window 60, FIG. 4, and enters an "enlarge" command, step 48 is executed to display the contents of expansion memory 16 as indicated at 71 in FIG. 7. If the user further selects symbols 63 and 65 displayed in window 60 and enters a "reduce" command, flow proceeds from step 49 to step 50. The contents of the compression memory 17 corresponding to the selected symbols 63 and 65 are read into the display processor 11 and the selected symbols 63 and 65 are displayed in reduced size and merged with the symbol 71 in the enlarged window as shown in FIG. 7.

What is claimed is:

1. A network map display system comprising:

a display unit;

a storage means for storing a plurality of hierarchically layered tables each including a plurality of entries, each entry containing a symbol, location data of a symbol of a telecommunications network item to be displayed in said display unit, and an identifier specifying a lower layer table;

a pointing device for selecting a symbol of a upper layer table currently displayed in said display unit;

a keyboard;

relocation processor means responsive to a command signal from said keyboard for detecting an entry of said upper layer table containing the selected symbol, reading information from all entries of a lower layer table specified by said entry of the upper layer table, securing a space in said display unit surrounding said selected symbol according to location data of said read information, and storing the read information into said entry of the upper layer table; and display processor means for displaying, in said secured space, a plurality of symbols contained in the information stored in said entry of the upper layer table.

2. A network map display system comprising:

a display unit;

storage means for storing a plurality of hierarchically layered tables each including a plurality of entries, each entry containing a symbol, location data of a symbol of a telecommunications network item to be displayed in said display unit, and an identifier specifying a lower layer table;

a point device for selecting multiple symbols of a upper layer table currently displayed in said display unit;

a keyboard;

an expansion memory;

a compression memory;

relocation processor means, responsive to a command signal from the keyboard and selection of multiple symbols displayed in said display unit by said pointing device, for (a) detecting multiple entries of a upper layer table corresponding to the selected multiple symbols, (b) reading information from all entries of a plurality of lower layer tables specified by said multiple entries of the upper layer table, and reading information from the multiple entries of said upper layer table, and (c) storing the read information of said plurality of lower layer tables in said expansion memory and storing the read information of the upper layer table in said compression memory if location data of said upper layer table indicates that there is no sufficient space to display all symbols of said plurality of lower layer tables; and display processor means, responsive to an "enlarge" command from said keyboard and selection of at least one displayed symbol by said pointing device, for displaying at least one symbol stored in said expansion memory in an enlarged window of said display unit, and further responsive to a "reduce" command from said keyboard and selection of one or more of displayed symbols by said pointing device for displaying one or more symbols stored in said compression memory in reduced size within said enlarged window and merging all the displayed symbols.

3. A network map display system comprising:

a display unit;

storage means for storing a plurality of hierarchically layered tables each including a plurality of entries, each entry containing a symbol, location data of an symbol of a telecommunications network to be displayed in said display unit corresponding to the symbol, and an identifier specifying a lower layer table;

a pointing device for selecting an symbol displayed in said display unit corresponding to a symbol of a upper layer table;

a keyboard; and a processor for performing the functions of:

a) responsive to a command signal from the keyboard and selection of an symbol currently displayed in the display unit by the pointing device, detecting an entry of a upper layer table containing the symbol of the selected symbol;

c) reading information from all entries of a lower layer table specified by said entry of the upper layer table;

d) securing a space in said display unit surrounding said selected symbol according to location data of said read information, and storing the read information into said entry of the upper layer table; and e) displaying, in said secured space, a plurality of symbols stored in said entry of the upper layer table.

4. A network map display system comprising:

a display unit;

storage means for storing a plurality of hierarchically layered tables, each table including a plurality of entries, each entry containing a symbol of a telecommunication network item, location data of the symbol to be displayed in said display unit, and an identifier specifying a lower layer table;

a pointing device for selecting a symbol of a upper layer table currently displayed in said display unit;

a keyboard;

an expansion memory;

a compression memory; and a processor for performing the functions of:

a) responsive to a command signal from the keyboard and selection of multiple symbols currently displayed in the display unit by said pointing device, detecting multiple entries of a upper layer table corresponding to the selected multiple symbols;

b) reading information from all entries of a plurality of lower layer tables specified by said multiple entries of the upper layer table, and reading information from the multiple entries of said upper layer table;

c) storing the read information of said plurality of lower layer tables into said expansion memory and storing the read information of the upper layer table into said compression memory if location data of said upper layer table indicates that there is no sufficient space to display all symbols of said plurality of lower layer tables;

d) responsive to an "enlarge" command from said keyboard and selection of at least one currently displayed symbol by said pointing device, displaying at least one symbol stored in said expansion memory in an enlarged window of said display unit corresponding to the selected symbol; and e) responsive to a "reduce" command from said keyboard and selection of one or more of said symbols currently displayed by said pointing device, displaying one or more symbols stored in said compression memory in reduced size within said enlarged window and merging all the displayed symbols.

5. A network map display system comprising:

a display unit;

storage means for storing a plurality of hierarchically layered tables, each table including a plurality of entries, each entry containing a symbol of a telecommunications network item, location data of the symbol to be displayed in said display unit, and an identifier specifying a lower layer table;

a pointing device for selecting a symbol of a upper layer table currently displayed in said display unit;

a keyboard;

an expansion memory;

a compression memory; and a processor for performing the functions of:

a) responsive to a command signal from the keyboard and selection of a symbol currently displayed in the display unit by the pointing device, detecting an entry of the upper layer table containing the symbol of the selected symbol;

b) reading information from all entries of a lower layer table specified by said entry of the upper layer table;

c) securing a space in said display unit surrounding said selected symbol according to location data of said read information, and storing the read information into said entry of the upper layer table;

d) displaying, in said secured space, a plurality of symbols stored in said entry of the upper layer table;

e) responsive to a command signal from said keyboard and selection of currently displayed multiple symbols by said pointing device, detecting multiple entries of the upper layer table corresponding the symbols of the selected multiple symbols;

f) reading information from all entries of a plurality of lower layer tables specified by said multiple entries of the upper layer table, and reading information from the multiple entries of said upper layer table;

g) storing the read information of said plurality of lower layer tables into said expansion memory and storing the read information of the upper layer table into said compression memory if location data of said upper layer table indicates that there is no sufficient space to display all symbols of said plurality of lower layer tables;

h) responsive to an "enlarge" command from said keyboard and selection of at least one currently displayed symbol by said pointing device, displaying at least one symbol stored in said expansion memory in an enlarged window of said display unit; and i) responsive to a "reduce" command from said keyboard and selection of one or more of said symbols currently displayed by said pointing device, displaying one or more symbols stored in said compression memory in reduced size within said enlarged window and merging all the displayed symbols.

* * * * *